Feb. 18, 1958     H. K. BROWN     2,823,905
CHARGE FORMING AND FUEL FEEDING APPARATUS
Filed Dec. 13, 1954     3 Sheets-Sheet 1

HERBERT K. BROWN
INVENTOR

BY
Harry O. Ernsberger
ATTORNEY

Feb. 18, 1958 H. K. BROWN 2,823,905
CHARGE FORMING AND FUEL FEEDING APPARATUS
Filed Dec. 13, 1954 3 Sheets-Sheet 2
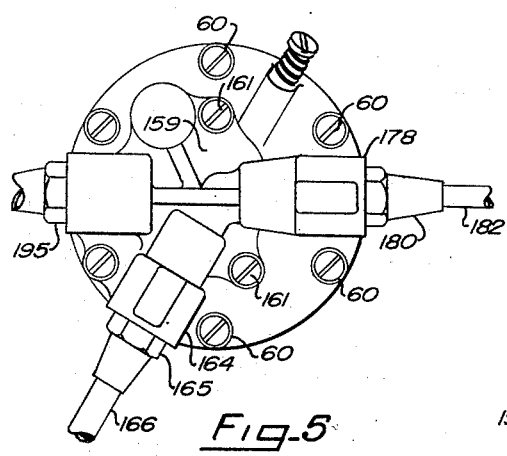
Fig-5
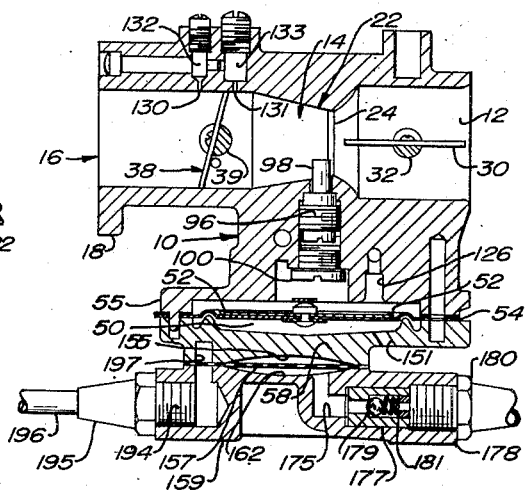
Fig-6
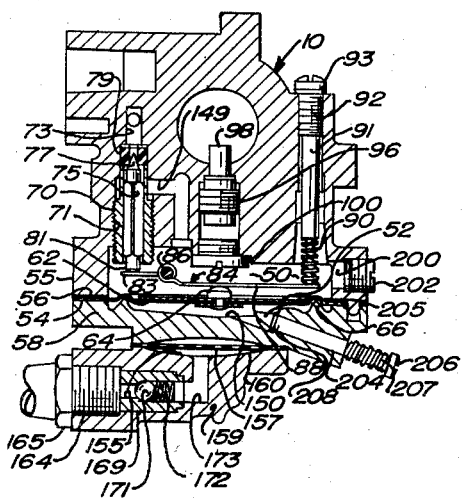
Fig-7
Fig-8
HERBERT K. BROWN
INVENTOR
BY
Harry O. Ernsberger
ATTORNEY Feb. 18, 1958 H. K. BROWN 2,823,905
CHARGE FORMING AND FUEL FEEDING APPARATUS
Filed Dec. 13, 1954 3 Sheets-Sheet 3

HERBERT K. BROWN
INVENTOR

BY
Harry O. Ernsberger
ATTORNEY

United States Patent Office 2,823,905
Patented Feb. 18, 1958

2,823,905

CHARGE FORMING AND FUEL FEEDING APPARATUS

Herbert K. Brown, Toledo, Ohio, assignor to The Tillotson Manufacturing Company, Toledo, Ohio, a corporation of Ohio Application December 13, 1954, Serial No. 477,728

4 Claims. (Cl. 261—37)

This invention relates to a combined charge-forming device and fuel-feeding means and, more especially, to a charge-forming device or carburetor embodying a diaphragm arrangement for controlling fuel flow to the carburetor in combination with a fuel feed device of the diaphragm type.

It has been conventional practice to utilize charge-forming devices or carburetors for internal-combustion engines embodying float-controlled valve means for regulating the delivery or flow of liquid fuel to a chamber in the carburetor from which the fuel is subsequently delivered into a passage and there mixed with air to provide a combustible mixture for an engine. Such an arrangement is satisfactory for use on relatively stationary industrial engines or automotive engines wherein the charge-forming device or carburetor remains or is maintained in a substantially horizontal position.

However, internal-combustion engines, particularly those of the relatively low horsepower, two-cycle type, have come into use as power units for operating mowers, chain saws and other kindred applications. For chain saw use, an engine equipped with a float valve controlled carburetor is wholly unusable for the reason, among others, that a chain saw construction of portable character must be adaptable for operation in all positions, including inverted position. A carburetor embodying a float-controlled inlet valve is rendered useless when the carburetor is moved from a substantially horizontal position. Furthermore, the vibrations usually present in a two-cycle-type engine cause erratic positioning or functioning of the fuel inlet valve-controlling float so that it is substantially impossible to deliver a homogeneous and uniform mixture to the engine. By reason of these difficulties, charge-forming devices or carburetors of a character embodying a diaphragm-controlled fuel inlet valve have been used to a limited extent even though such mechanisms are of a critical character, requiring precise adjustments. In such arrangements, the fuel reservoir or tank containing a limited supply of liquid fuel for the engine is usually fixedly attached to the engine or its supporting means and, hence, is subjected to use in various positions. In such installations the fuel receptacle or tank has been pressurized either by extraneous means, such as a hand pump, or direct from the engine crankcase through the use of a suitable check valve. The use of crankcase pressure in such installations has many disadvantages in that the crankcase pressure is too high and fuel vapor pressure often builds up thus increasing the pressure, a condition which may result in the delivery of an over rich mixture to the engine.

An object of the present invention resides in the utilization of a fuel-feeding means embodied in a carburetor, wherein the pressure variations in the crankcase of a two-cycle engine are utilized in conjunction with a pressure-sensitive diaphragm for establishing flow of liquid fuel from a fuel reservoir or supply tank to the carburetor whereby a substantially constantly acting fuel pressure is effective at all times during engine operation to supply fuel to the carburetor.

Another object of the invention resides in a combined charge-forming device or carburetor embodying a diaphragm-controlled fuel inlet valve and a fuel-feeding means embodying a flexible diaphragm as a fuel-pumping element wherein pressure of fuel to the carburetor is present at all times during engine operation whereby the carburetor is adapted to feed fuel to the mixing passage at a substantially uniform rate to provide a homogeneous combustible mixture delivered to the engine.

Another object of the invention resides in the provision of a combined carburetor and fuel pump construction which avoids the use of a pressurized fuel supply tank or reservoir.

Another object of the invention resides in a combined carburetor and fuel feed or pump construction of a character usable in any position of operation.

Still another object of the invention resides in the provision of a manually controlled means engageable with the diaphragm to open the fuel inlet valve of the carburetor for flushing or cleaning the fuel chamber in the carburetor.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 5 is a bottom plan view of the construction shown in Figure 1;

Figure 6 is a vertical sectional view through the carburetor and fuel pump construction, the section being taken substantially on the line 6—6 of Figure 4;

Figure 7 is a vertical sectional view taken substantially on the line 7—7 of Figure 4;

Figure 8 is a fragmentary sectional view taken substantially on the line 8—8 of Figure 4;

Figure 1:
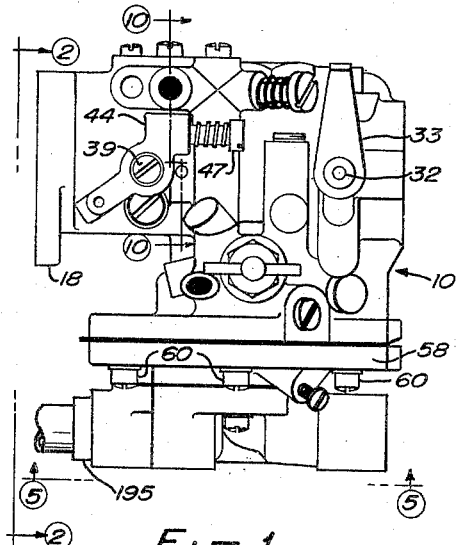
Figure 1 is a side elevational view of the combined charge-forming means and fuel feed construction of the invention.
Figure 2:
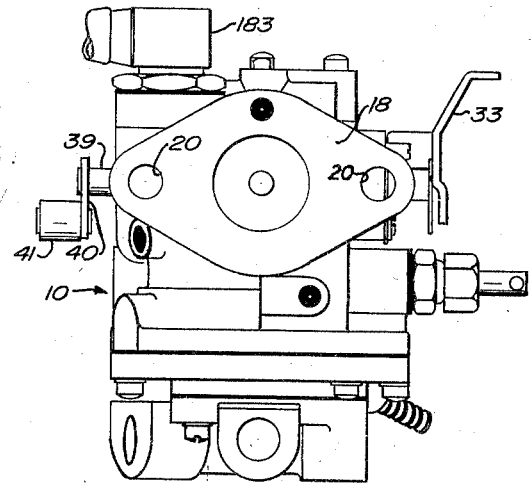
Figure 2 is a view of one end of the carburetor shown in Figure 1, the view being in the direction of the line 2—2 of Figure 1.
Figure 3:
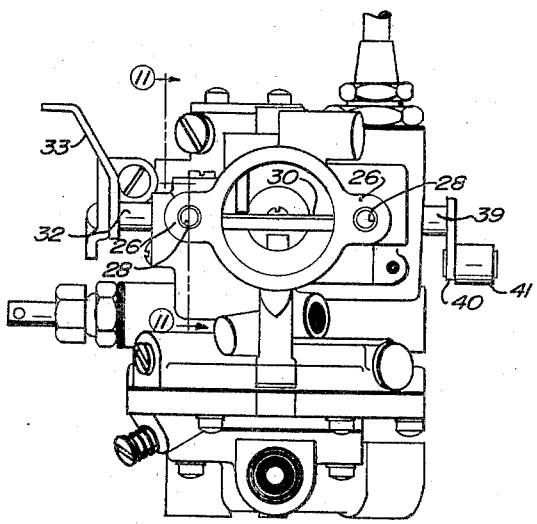
Figure 3 is a view of the opposite end of the construction shown in Figure 1.

While the arrangement of the invention is particularly inclusive of a combined carburetor and fuel pump wherein the carburetor is equipped with a diaphragm-controlled, fuel inlet valve, it is to be understood that the fuel feed arrangement may be embodied in carburetor constructions utilizing float-controlled, fuel inlet valves without departing from the spirit of the invention.

In an engine of the two-cycle type wherein the mixture in the cylinder or cylinders is ignited at each revolution of the crankshaft, the mixture of fuel and air is drawn into the crankcase from the charge-forming device by outward movement of the piston or pistons, establishing subatmospheric or lowered pressure in the crankcase. The mixture in the crankcase is transferred to the cylinders by suitable passage means as the pistons approach their lowermost positions, the incoming mixture scavenging the exhaust gases from the cylinders. The carburetor of the present invention is particularly adapted for forming a fuel mixture for delivery into the crankcase, and the differential pressures existent in the crankcase during engine operation provide the motivating forces for feeding fuel to the charge-forming device or carburetor.

Referring to the drawings in detail, the charge-forming device or carburetor component is inclusive of a body 10, preferably formed of cast metal and provided with an air inlet passage 12, a mixing pasage 14 and a mixture outlet 16. The carburetor body 10 is formed with a flange portion 18 adapted to be secured to the crankcase of a two-cycle engine with the mixture outlet 16 in registration with an opening into the crankcase. The flange member 18 is provided with openings 20 to receive bolts for fixedly securing the carburetor to the engine crankcase.

The mixing passage 14 is inclusive of a venturi configuration 22, the restriction or choke band of the venturi being indicated at 24. The carburetor body adjacent the air inlet 12 is formed with bosses 26 having threaded openings 28 to receive bolts or other means for attaching an air filter or cleaner (not shown) to the carburetor.

Figure 11:
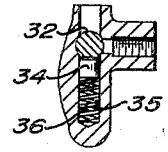
Figure 11 is a fragmentary sectional view taken substantially on the line 11—11 of Figure 3.

Disposed in the air inlet passage 12 is an air control or choke valve in the form of a circular disc 30 secured on a shaft 32 extending transversely of the inlet passage and journaled in suitable bearings formed in the carburetor body. The shaft 32 is provided at one end with a manipulating arm or finger 33 for controlling the position of the air valve. As shown in Figure 11, a plunger 34, contained in a bore 35 in the carburetor body, is biased into engagement with the shaft 32 by a coil spring 36 for frictionally retaining the choke valve 30 in any position of adjustment.

The mixing passage 14 is provided with a disc-type throttle valve 38 supported upon a shaft 39 which extends transversely across the passage 14 and is journaled in suitable bearings or bores formed in the carburetor body 10. One end of the shaft 39 projects exteriorly of the carburetor body and is provided with an arm 40 supporting a member 41 for manipulating or controlling the position of the throttle valve 38. The opposite end of shaft 39 is provided with a fitting 44 having a portion having a threaded bore to accommodate a threaded member 47 which is held in adjusted position by means of friction set up by a spring 49. The position of the threaded member 47 determines the minimum engine speed or idling position of the throttle valve 38.

The body of the carburetor is provided with a fuel-receiving chamber, reservoir or bowl 50 arranged to receive and contain liquid fuel supplied to the carburetor in a manner hereinafter explained. Extending across and forming one wall of the chamber 50 is an imperforate membrane or diaphragm 52 which may be formed of thin, flexible metal or fabric treated or coated with an impregnant which is not affected by contact with hydrocarbon fuels. The peripheral portion 54 of the diaphragm is adapted to be disposed in contiguous relation with a lower flange portion 55 formed on the body 10 and directly engages a sealing gasket 56 disposed between the peripheral portion 54 and flange portion 55 of the carburetor body.

Disposed beneath the diaphragm 52 is a member 58 secured to flange portion 55 of the carburetor body by means of screws 60. The securing screws 60 also hold the peripheral portion 54 of the diaphragm in sealing engagement with gasket 56. The diaphragm 52 is preferably reinforced at its central zone by means of a disc 62 secured to the diaphragm by a member 64 shown in Figure 7.

Means is provided for limiting movement of diaphragm 62 in the direction of the member or supplemental body 58 by an annular bead or ridge 66 which is normally slightly spaced from the diaphragm in the manner shown in Figures 6 and 7. When the carburetor construction is in a position wherein the diaphragm 52 is substantially vertical, the fuel flows to the lowest zone of chamber 50 and exerts a pressure on the adjacent zone of the diaphragm 52. When this condition obtains, the ridge 66 limits the movement of the diaphragm and prevents the diaphragm from collapsing.

The body portion of the carburetor is provided with a threaded bore 70 within which is disposed a hollow fitting 71 having a bore or passage therethrough which communicates with a duct or channel 73 through which fuel is delivered from a source of supply to the chamber or bowl 50. Disposed within the passage or bore in the fitting 70 is a valve member 75 having a body portion of polygonal cross section, for example, square or triangular shape. The valve member 75 is formed at its upper end with a cone-shaped or pointed extremity 77 adapted for cooperation with a valve seat member 79 which has a passage therethrough in communication with the fuel inlet duct or passage 73. The cone-shaped portion 77 of valve member 75 and seat member 79 cooperate to control or regulate the fuel flow into the chamber 50 in a manner hereinafter explained. The valve seat member 79 is preferably formed of resilient material such as synthetic rubber or the like so as to provide a resilient or flexible seat for the valve. The use of a flexible valve seat minimizes wear of the valve and thus prolongs the life of the valve.

Figure 12:
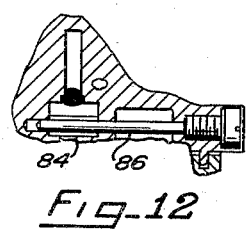
Figure 12 is a fragmentary, detailed sectional view taken substantially on the line 12—12 of Figure 4.
Figure 13:
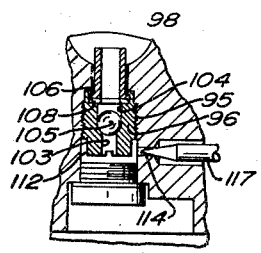
Figure 13 is an enlarged sectional view through the main fuel nozzle of the carburetor.

The opposite end of valve member 75 is formed with a tenon portion 81 adapted to engage or contact an arm 83 of a lever member 84 pivotally supported intermediate its ends upon a pin or shaft 86 carried by the body portion of the carburetor and particularly shown in Figure 12. The other arm 88 of the lever member 84 is engaged adjacent its extremity by spring means, preferably an expansive coil spring 90.

The upper end of the spring 90 engages a member or abutment 91 having a portion 92 threaded into a bore in the carburetor body and having a head portion 93 adapted to receive a suitable tool for regulating the position of the member 91. By adjusting the relative position of member 91, the expansive pressure of spring 90 effective on the lever 84 may be controlled. By this means, the effective pressure biasing the valve member 75 toward valve-seating position may be controlled by varying the pressure of the spring 90 in the above-described manner.

The carburetor component is provided with a main nozzle construction for discharging fuel from chamber 50 into the mixing passage 14. Formed in the carburetor body is a threaded bore 95 which receives a fitting 96 provided with a fuel discharge tube or nozzle 98 which projects into the mixing passage as shown in Figures 6, 7 and 8. The lower end of threaded bore 95 is closed by means of a threaded plug 100. The nozzle is preferably disposed adjacent or near the choke band 24 of the venturi construction 22 of the mixing passage so that the highest air velocity through the mixing passage is effective on the nozzle 98 to deliver fuel into the passage.

The fitting 96 is formed with a passage 103 which communicates with a passage or bore 104 of larger diameter. A ball check valve 105 is disposed in the bore 104. The nozzle construction 98 is formed independently of the fitting 96 and has a ledge or flange portion 106 which nests in an enlarged bore formed in fitting 96. Disposed between fitting 96 and ledge 106 is a perforated disc or abutment 108 which is adapted to permit flow of fuel from duct 103 through the nozzle 98 and which limits the uppermost position of the ball check valve 105 when the carburetor is inverted.

The carburetor body is provided with a boss portion 110 formed with a bore 111 which is in communication by means of a restricted passage 114 with an annular space 112 provided adjacent the fitting 96. A manually adjustable needle valve member 115 is disposed in the bore 111 to meter or regulate the flow of fuel to the main nozzle. The forward portion of member 115 is tapered, as shown at 117, and is adapted to project into the restricted passage 114 to regulate the flow of fuel from bore 111 into the space 112 adjacent the fitting 96. Threaded into a bore in the boss 110 is a fitting 119, the latter being formed with an interiorly threaded bore to accommodate a threaded portion 120 formed on a needle valve 115. A stuffing gland or sealing means 122 is provided to prevent seepage of fuel along valve 115 to the exterior of the carburetor body. The portion of the valve or valve member 115 extending exteriorly of the carburetor body is provided with a transversely extending pin 124, providing a manipulating means for manually adjusting the valve 115 to control fuel flow through the restricted passage 114 to the main nozzle 98. The bore 111 is in communication with the fuel chamber 50 by means of a duct 126 shown in Figure 14, the semidiagrammatic view, and in Figure 6. Thus, fuel is enabled to flow from chamber 50 to the mixing passage through duct 126, bore 111, restricted passage 114, space 112 adjacent fitting 96, bores 103 and 104, past the check valve 105 and through the main nozzle 98 into the mixing passage.

The carburetor construction is provided with an arrangement functioning independently of the main fuel nozzle for supplying fuel to the mixing passage 14 for engine-idling purposes. The wall of the cylindrical outlet portion 16 of the mixing passage 14 is formed with fuel discharge orifices 130 and 131 which are in communication with ducts 132 and 133, respectively. The orifice 130 will be referred to as a primary idling orifice and orifice 131 will be referred to as a secondary orifice. The ducts 132 and 133 are in communication through the medium of a channel 135 shown in Figure 14, the semi-diagrammatic view. The duct 135 is in communication with duct 137 through a restricted passage 138 into which extends the tapered extremity of the fuel-regulating valve 140 for engine-idling purposes.

Figure 14:
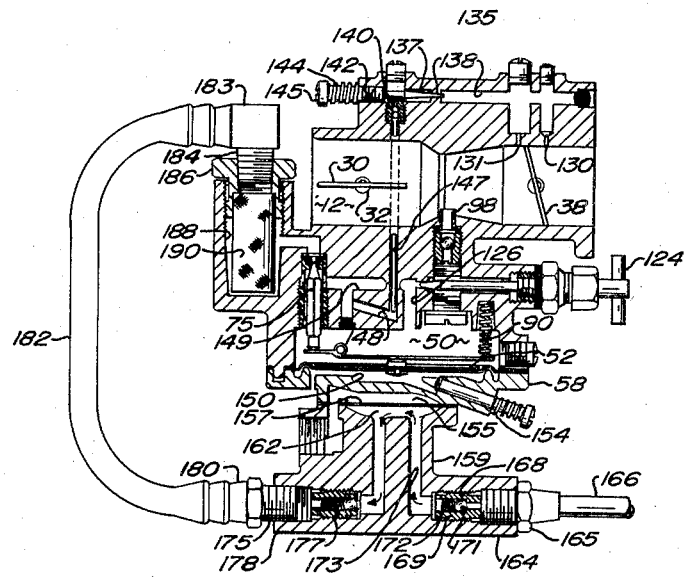
Figure 14 is a semidiagrammatic, expanded sectional view illustrating the fuel flow passages in the carburetor and fuel feed construction.
Figure 9:
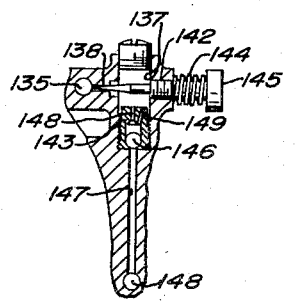
Figure 9 is a fragmentary, detailed sectional view taken substantially on the line 9—9 of Figure 4.
Figure 10:
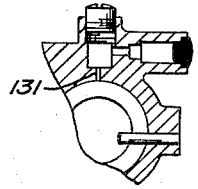
Figure 10 is a fragmentary, detailed sectional view taken substantially on the line 10—10 of Figure 1.

The needle valve 140 for regulating fuel flow to the idling or low-speed orifices is formed with a threaded portion 142 received in a threaded bore formed in the carburetor body. A coil spring 144, disposed between an exterior surface of the carburetor body and a head 145 formed on the valve construction, serves to establish a friction component for retaining the valve 140 in adjusted position. By rotating valve 140, it may be adjusted to regulate or control the fuel flow in the mixing passage through orifices 130 and 131. The chamber or duct 137 is in communication with the vertically disposed duct or passage 147, as shown in Figures 9 and 14, and passages 148 and 149 to receive fuel from the chamber in which is disposed the fuel inlet controlling valve 75 shown in Figure 7. In this manner, idling orifices 130 and 131 normally receive liquid fuel from a zone adjacent the fuel inlet control valve 75.

As shown in Figure 9, a fitting 143 encloses a ball check valve 146. The upper portion of the fitting 143 is provided with a passage or duct 148 and a second passage or duct 149 of smaller cross-sectional area. When the carburetor is in a substantially horizontal position, fuel moves upwardly through passage 147, past the ball check valve 146, through passages 148 and 149 and is delivered to the idling or low-speed orifices 130 and 131 when the engine is operating at low or idling speed. When the carburetor is inverted or is in a substantially inverted position, the larger passage 148 is closed by the check valve 146 so that during a period of inversion of the carburetor, the engine will receive a restricted amount of fuel, sufficient for idling purposes, through the smaller passage 149, the closure of the larger passage 148 preventing an excess delivery of fuel through the idling or low-speed orifices 130 and 131.

The air chamber or compartment 150, formed between the enclosure or member 58 and diaphragm 52, is vented to the atmosphere by means of a passage 151 shown in Figure 6. As previously stated, an air cleaner or filter (not shown) is connected to the air inlet passage 12 to separate or remove dust and foreign particles from air entering the passage 12.

The arrangement of the invention is especially adapted for use in providing a fuel-and-air mixture for engines of the two-cycle type. The present invention is inclusive of a means for feeding or pumping liquid fuel from a supply to the fuel inlet formed in the body. The fuel-feeding or pumping means illustrated in the drawings is of the diaphragm type and is adapted to be actuated by variable pressure, for example, the rise and fall of pressure in the crankcase of the engine with which the carburetor is used. The member 58, disposed beneath diaphragm 52 in the carburetor chamber 50, is formed with a concave wall 154 which defines one wall of a compartment or chamber 155 shown in Figures 6, 7 and 14; a diaphragm or pumping element 157 defining the other wall of chamber 155. The peripheral zone of diaphragm 157 is disposed between contiguous surface portions of members 58 and 159. Member 159 is also formed with a concave wall 160 which defines a wall of a compartment or chamber 162, the diaphragm 157 defining the other wall of chamber 162. Member 159 is secured to member 58 by means of screws 161 and is formed with a boss portion 164 which is bored and threaded to receive a fitting 165 connected with a fuel supply tube 166 which is in communication with a fuel tank or other fuel supply (not shown). The boss portion 164 is formed with a passage of reduced diameter which is threaded as at 168 to receive a fitting 169 having a passage therethrough. A ball check valve 171 is disposed in the passage and is normally resiliently urged to closed position under the influence of a coil spring 172. The passage in fitting 169 is in communication with a passage or duct 173 leading into chamber 162 beneath diaphragm 157 as shown in Figures 7 and 14. A second passage 175, shown in Figure 6, is in communication with a passage through a fitting 177 contained in a boss portion 178 of member 159. A ball check valve 179 is contained within fitting 177 biased to closed position by a coil spring 181. The boss portion 178 is bored and threaded to receive a fitting or coupling 180 which is connected by means of a tube 182 with a fitting or coupling 183 having a threaded portion 184 extending into a bushing 186 which is threaded into a bore 188 formed in the carburetor body 10. Disposed in bore 188 is a filter or screen 190 for preventing ingress into the chamber 50 of any foreign matter in the liquid fuel. Thus, fuel from a fuel tank or supply (not shown) is conveyed to the fuel inlet in the carburetor through tube 166, fitting 169, passage 173, pumping chamber 162, passage 175, fittings 177 and 180, tube 182 and fitting 183.

Figure 4:
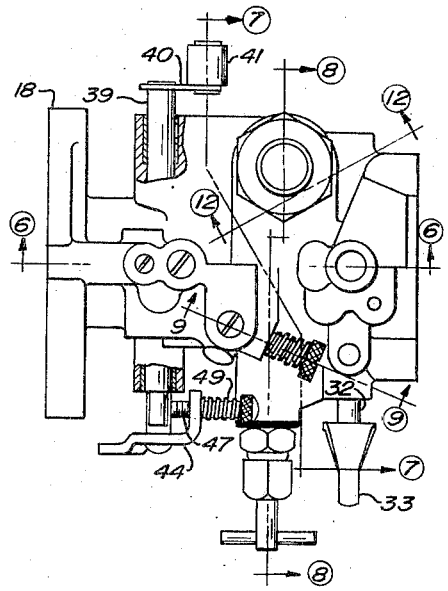
Figure 4 is a top plan view of the construction shown in Figure 1.

The chamber 155 at the opposite side of diaphragm 157 is arranged to be connected with the crankcase of the two-cycle engine with which the carburetor and fuel-feeding device are used. In this type of engine the pressure varies continuously due to the changing volume through the reciprocation of the piston, the pressure varying substantially the same amount with each revolution of the engine crankshaft. In the present invention, the variations in crankcase pressure are employed to establish a pumping action or reciprocation of diaphragm 157. As shown in Figures 6 and 14, member 159 is provided with a threaded opening 194 which receives a coupling 195 connected with the engine crankcase by a tube 196. The opening 194 is in communication with chamber 155 by means of a duct or passage 197. The pressure variations in the crankcase are thus communicated to chamber 155 and are effective to cause reciprocating action of the diaphragm and, hence, a pumping action of the fuel in chamber 162 at the opposite side of diaphragm 157. Therefore, during the operation of the two-cycle engine, upward movement of the piston in the cylinder causes a decrease in pressure or partial vacuum in the crankcase and, hence, a decrease in pressure in chamber 155. This decrease in pressure in chamber 155 results in diaphragm 157 moving in a direction to contract or reduce the volume of chamber 155 and enlarge the volume of chamber 162. When chamber 162 is thus enlarged, fuel flows from the supply through tube 166 and past check valve 171 into chamber 162 to equalize the pressure therein. On the subsequent down stroke of the piston of the engine, crankcase pressure is increased, and the increased pressure is communicated to chamber 155, resulting in the diaphragm moving in the opposite direction to expand the volume of compartment or chamber 155 and to reduce the volume of fuel chamber 162. Upon reduction of the volume of chamber 162, fuel is forced past the check valve 179 in fitting 177, through pipe 182 into bore 188 in the carburetor body 10 and thence past fuel inlet valve 75, when the valve is opened, into the chamber 50. Thus, fuel from the supply will be delivered into carburetor chamber 50 to replenish the fuel in chamber 50 as the fuel therein is discharged into mixing passage 12 through the main nozzle 99. When the fuel pressure in chamber or reservoir 50 reaches a predetermined value, the diaphragm 52, forming a wall of fuel chamber 50, is moved downwardly, as viewed in Figures 4 and 14; and the pressure of spring 90, acting through lever 84, causes fuel inlet valve 75 to be moved to closed position, interrupting flow of fuel into the chamber 50. Under this condition, fuel in the feeding or pumping chamber 162 is prevented from flowing into carburetor chamber 50 as inlet valve 75 is closed. The pumping action of fuel-pumping diaphragm 157 ceases by reason of the increased fuel pressure in chamber 162. The increased pressure is maintained in chamber 162 because the ball check 171 prevents the return flow of fuel through tube 166 to the fuel supply or reservoir. When the fuel pressure decreases in the fuel chamber 50, due to the discharge of fuel through nozzle 99 into the mixing passage or through idling or low-speed orifices 130 and 131, the pressure on diaphragm 52 is decreased, the diaphragm moving upwardly and swinging lever 84 against the pressure of spring 90, causing fuel inlet valve 75 to be moved from its seat 79, thus permitting resumption of fuel flow from pumping chamber 162 into chamber 50. Diaphragm 157 is thereafter reciprocated by the variations in engine crankcase pressure until the requisite amount of fuel is again delivered into the carburetor fuel chamber 50.

A means is provided for quickly flushing the fuel chamber 50 when desired. As shown in Figure 7, the body 10 is provided with a threaded opening or passage 200 which is normally closed by a threaded plug 202. Member 53 is provided with a bore in which is disposed a pin 204 having a tapered extremity 205 which is normally out of contact with the diaphragm 52. The pin 204 is formed at its other end with a head 206, an expansive coil spring 207 being disposed between the head 206 and a surface of the body 10.

When it is desired to flush the fuel chamber 50, the threaded plug 202 is removed. The operator then exerts inward pressure on the pin 204, thereby engaging the extremity 205 with the diaphragm 52 to prevent relative movement of the diaphragm. The inward movement of the pin elevates the diaphragm, causing inlet valve 75 to open. The engine is then rotated a few revolutions by manual means in the conventional manner as in starting the engine, effecting a pumping action of fuel feed diaphragm 157, causing the flow of fuel past the inlet valve 75 through the chamber 50, the fuel being discharged through passage 200. After the flushing action is completed, the pin 204 is automatically moved outwardly under the expansive pressure of spring 207, and the plug 202 is replaced in the opening 200. The outward movement of pin 204 is limited by an abutment 208 carried by the pin 204 as shown in Figure 7.

From the foregoing, it will be apparent that the arrangement of combined diaphragm carburetor and diaphragm fuel-feeding means or pump provides continuous delivery of fuel into the mixing passage, irrespective of the relative position of the carburetor and fuel feed structure and the engine. The use of diaphragms for initiating delivery of fuel to a carburetor chamber and for assuring, through diaphragm-pumping action, a flow of fuel from a supply to the carburetor makes possible the operation of an engine in any position, whether vertical, on its side or inverted. Thus, an arrangement of the character of this invention enables the practical operation of a two-cycle engine for chain saw use and lawnmower operation on hillsides and irregular terrain where a float-controlled carburetor would not function satisfactorily and would not function at all in inverted position.

It is apparent that, within the scope of the invention, modifications and different arrangements may be made other than is herein disclosed, and the present disclosure is illustrative merely, the invention comprehending all variations thereof.

I claim:

1. A charge forming apparatus of the character disclosed in combination, a plurality of interconnected members, one of said members being formed with a mixing passage and an unvented fuel chamber, a first diaphragm forming a wall of said fuel chamber, orifice means for delivering fuel from said chamber into said mixing passage; a fuel pump supported entirely by and connected to said charge forming apparatus comprising a second diaphragm disposed between two of said members substantially parallel to said first diaphragm and to a plane intersecting the axis of said mixing passage, the regions of said members adjacent said second diaphragm being shaped to provide with said second diaphragm a fuel passage and a pulsing chamber, said pulsing chamber being arranged for communication with a source of pulsating fluid pressure for actuating said second diaphragm, a duct arranged to connect the fuel passage with a supply for conveying fuel from the source to said fuel passage, a fuel inlet formed in said member containing the mixing passage, a second duct connecting said fuel passage with said fuel inlet, a fuel control valve in said inlet, a lever in said fuel chamber fulcrumed upon said member formed with said mixing passage and having portions in operative engagement with said first diaphragm and said control valve, spring means biasing said lever in a direction to close said control valve, and valve means associated with each of said ducts for effecting flow of fuel from said supply through said fuel passage under the influence of pulsating fluid pressure acting on said second diaphragm, said first diaphragm being actuated solely by aspiration of reduced pressure in said mixing passage for effecting fuel delivery from said fuel chamber through the orifice means into said mixing passage.

2. A charge forming apparatus of the character disclosed in combination, a plurality of interconnected members, one of said members being formed with a mixing passage and an unvented fuel chamber, a first diaphragm forming a wall of said fuel chamber, orifice means for delivering fuel from said chamber into said mixing passage; a fuel pump supported entirely by and connected to said charge forming apparatus comprising a second diaphragm disposed between two of said members substantially parallel to said first diaphragm and to a plane intersecting the axis of said mixing passage, said second diaphragm having an effective working area less than that of said first diaphragm; the regions of said members adjacent said second diaphragm being shaped to provide with said second diaphragm a fuel passage and a pulsing chamber, said pulsing chamber being arranged for communication with a source of pulsating fluid pressure for actuating said second diaphragm, a duct arranged to connect the fuel passage with a supply for a conveying fuel from the source to said fuel passage, a fuel inlet formed in said member containing the mixing passage, a second duct connecting said fuel passage with said fuel inlet, a fuel control valve in said inlet, a lever in said fuel chamber fulcrumed upon said member formed with said mixing passage and having portions in operative engagement with said first diaphragm and said control valve, spring means biasing said lever in a direction to close said control valve, and valve means associated with each of said ducts for effecting flow of fuel from said supply through said fuel passage under the influence of pulsating fluid pressure acting on said second diaphragm, said first diaphragm being actuated solely by aspiration of reduced pressure in said mixing passage for effecting fuel delivery from said fuel chamber through the orifice means into said mixing passage.

3. A charge forming apparatus of the character disclosed in combination, a plurality of interconnected members, one of said members being formed with a mixing passage and an unvented fuel chamber, a first diaphragm forming a wall of said fuel chamber, orifice means for delivering fuel from said chamber into said mixing passage; a fuel pump supported entirely by and connected to said charge forming apparatus comprising a second diaphragm disposed between two of said members substantially parallel to said first diaphragm and to a plane intersecting the axis of said mixing passage, said second diaphragm having an effective working area less than that of said first diaphragm; the regions of said members adjacent said second diaphragm being shaped to provide with said second diaphragm a fuel passage and a pulsing chamber, said pulsing chamber being arranged for communication with a source of pulsating fluid pressure for actuating said second diaphragm, a duct arranged to connect the fuel passage with a supply for conveying fuel from the source to said fuel passage, a fuel inlet formed in said member containing the mixing passage, a second duct connecting said fuel passage with said fuel inlet, a fuel control valve in said inlet, a lever in said fuel chamber fulcrumed upon said member formed with said mixing passage and having portions in operative engagement with said first diaphragm and said control valve, spring means biasing said lever in a direction to close said control valve, and valve means associated with each of said ducts for effecting flow of fuel from said supply through said fuel passage under the influence of pulsating fluid pressure acting on said second diaphragm, said first diaphragm being actuated solely by aspiration of reduced pressure in said mixing passage for effecting fuel delivery from said fuel chamber through the orifice means into said mixing passage; a removable plug closing a plug opening in said fuel chamber, and means for flushing said fuel chamber comprising a member normally biased out of engagement with said diaphragm for raising said diaphragm, whereby upon removal of said plug and actuation of said normally biased member, said diaphragm is caused to move upwardly thereby opening said fuel control valve in said inlet to discharge the fuel through said plug opening upon rotation of said engine.

4. A charge forming apparatus of the character disclosed in combination, a plurality of interconnected members, one of said members being formed with a mixing passage and an unvented fuel chamber, a diaphragm forming a wall of said fuel chamber, orifice means for delivering fuel from said chamber into said mixing passage, a second diaphragm disposed between two of said members, the regions of said members adjacent the second diaphragm being shaped to provide with said second diaphragm a fuel passage and a pulsing chamber, said pulsing chamber being arranged for communication with a source of pulsating fluid pressure for actuating said second diaphragm, a duct arranged to connect said fuel passage with a fuel supply for conveying fuel from the source to said fuel passage, a fuel inlet formed in said member containing said mixing passage, a second duct connecting the fuel passage with said fuel inlet, a fuel flow control valve in said inlet, a lever in said fuel chamber fulcrumed upon said member formed with said mixing passage and having portions in operative engagement with said first diaphragm and said control valve, spring means biasing said lever in a direction to close said control valve, valve means associated with each of said ducts for effecting flow of fuel from the supply through said fuel passage under the influence of pulsating fluid pressure acting on said second diaphragm, said first diaphragm being actuated solely by aspiration of reduced pressure in said mixing passage for effecting fuel delivery from said fuel chamber through the orifice means into said mixing passage; a removable plug closing a plug opening in said fuel chamber, and means for flushing said fuel chamber comprising a member normally biased out of engagement with said diaphragm for raising said diaphragm, whereby upon removal of said plug and actuation of said normally biased member, said diaphragm is caused to move upwardly thereby opening said fuel control valve in said inlet to discharge the fuel through said plug opening in said fuel chamber upon rotation of said engine.

References Cited in the file of this patent

UNITED STATES PATENTS

| | | |
|---|---|---|
| 1,022,803 | Troutt | Apr. 9, 1912 |
| 2,345,168 | Wirth et al. | Mar. 28, 1944 |
| 2,598,147 | Tescher | May 27, 1952 |
| 2,713,854 | Conover | July 26, 1955 |
| 2,724,584 | Armstrong | Nov. 22, 1955 |
| 2,728,564 | Bracke | Dec. 27, 1955 |
| 2,733,902 | Phillips | Feb. 7, 1956 |
| 2,801,621 | Anderson et al. | Aug. 6, 1957 |

FOREIGN PATENTS

| | | |
|---|---|---|
| 930,988 | France | Sept. 15, 1947 |